INVENTOR.
FRANCIS T. SPELLMAN, JR.
BY
Andrus & Starke
ATTORNEYS

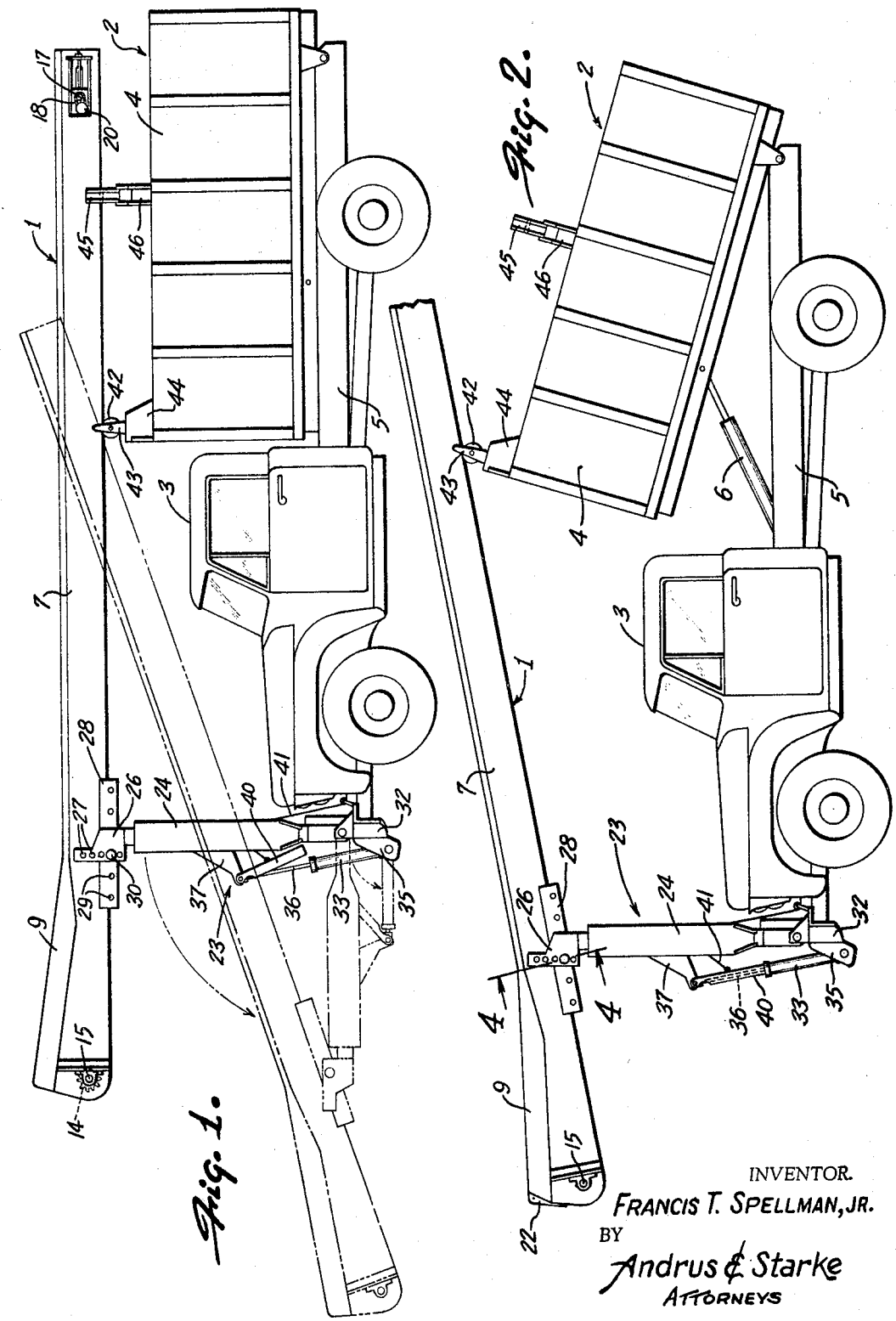

United States Patent Office 3,263,844
Patented August 2, 1966

3,263,844
VEHICLE MOUNTED CONVEYOR
Francis T. Spellman, Jr., Rte. 1, Verona, Wis.
Filed July 24, 1964, Ser. No. 384,916
10 Claims. (Cl. 214—508)

This invention relates to a conveying mechanism, and more particularly to a conveyor mounted on a vehicle, such as a truck, and adapted to load material into the truck.

Feed mill trucks travel to farms in the area of the mill and pick up various types of farm products, such as grain, shelled corn, baled hay, and the like, and haul the material to the mill. In most cases, the bulk material is manually shoveled into the truck and this is a time-consuming task which usually requires the labor of two men. In some cases, portable conveying units are used for loading the material into the truck. However, the portable conveying units generally need to be assembled and disassembled for the conveying operation, and due to their lightweight construction, are frequently damaged during handling or assembly.

The present invention is directed to a conveying mechanism which is permanently mounted on a truck and can be utilized to load a wide variety of material into the body of the truck. According to the invention, an elongated carrier is mounted above the truck and extends in a fore-and-aft direction with respect to the truck. The conveyor is supported by a pivotal boom and the lower end of the boom is connected to the bumper of the truck, while the upper end of the boom is pivotally connected to the forward portion of the conveyor. The boom is pivoted by a hydraulic unit from a generally vertical position, in which the conveyor is located horizontally above the truck, to a generally horizontal position, in which the conveyor is inclined with the forward end of the conveyor being located substantially at ground level and the rear end of the conveyor being located above the body of the truck.

To support the rear end of the conveyor in movement, a guide roller is mounted on an extension or nose cap on the forward portion of the dump body of the truck, and the conveyor rides on the roller as it is moved from the horizontal transporting position to the inclined conveying position. When it is desired to dump the material from the body, the body is tilted and the conveyor will then ride upwardly along the guide roller as the dump body is tilted to the dumping position.

The conveyor is permanently attached to the truck and can be readily moved from the generally horizontal transporting position to the inclined conveying position. Moreover, even though the conveyor is located above the dump body when in the transporting position, the manner of mounting permits the dump body to be pivoted without having to move or re-position the conveyor.

With the use of the conveyor mechanism of the invention, bulk materials can be loaded extremely rapidly into the dump body. Moreover, only one man is necessary to drive and load the truck and this eliminates the labor cost of an additional man which is normally necessary when the materials are manually loaded.

In addition to loading and conveying farm products such as grain, shelled corn, cob corn, baled hay, and the like, the conveyor can also be used to load sand, gravel, coal, or any other bulk material.

Other objects and advantages will appear in the course of the following description.

The drawings illustrate the best mode presently contemplated of carrying out the invention.

In the drawings:

FIG. 1 is a side elevation of the conveyor unit as mounted on the dump body of the truck with the conveyor shown in the transporting position and the phantom lines indicating the conveying position of the conveyor;

FIG. 2 is a side elevation similar to FIG. 1 showing the position of the conveyor when the dump body is pivoted to the dump position;

Figure 3:
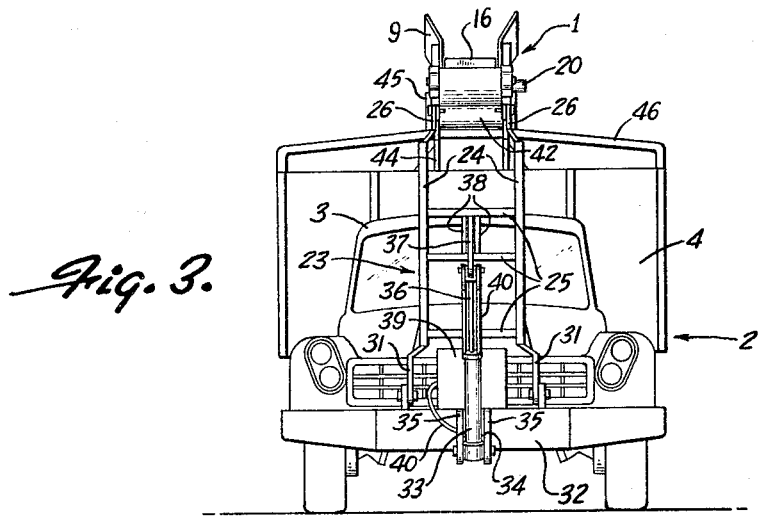
FIG. 3 is a front view of the conveyor unit mounted on the truck.

The drawings illustrate a conveyor 1 which is permanently mounted on truck 2 and is adapted to convey and load material into the truck.

The truck 2 is a conventional dump body type and includes a cab 3 and a dump body 4 which are mounted on a chassis 5. The body 4 is adapted to be pivoted from a generally horizontal position to an inclined dumping position by a standard hydraulic unit indicated by 6.

The conveyor 1 is an open top, trough-like structure and includes a pair of spaced side walls 7 which are connected by a bottom wall 8. The forward ends of side walls 7 are flared outwardly as indicated at 9 to provide a hopper-like inlet for material being introduced into the conveyor.

Figure 4:
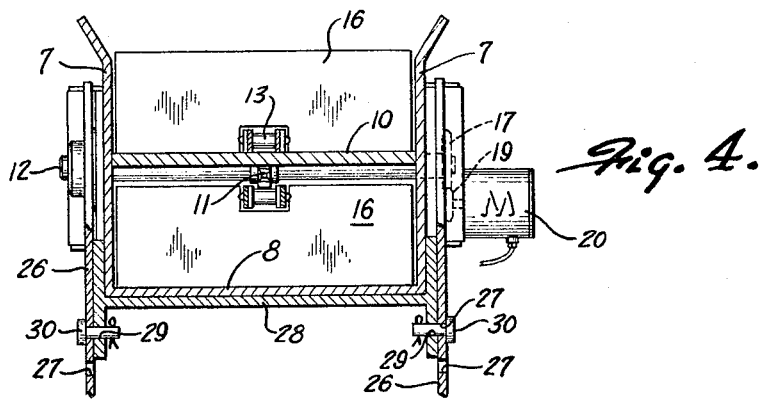
FIG. 4 is a transverse section taken along line 4—4 of FIG. 2.
Figure 5:
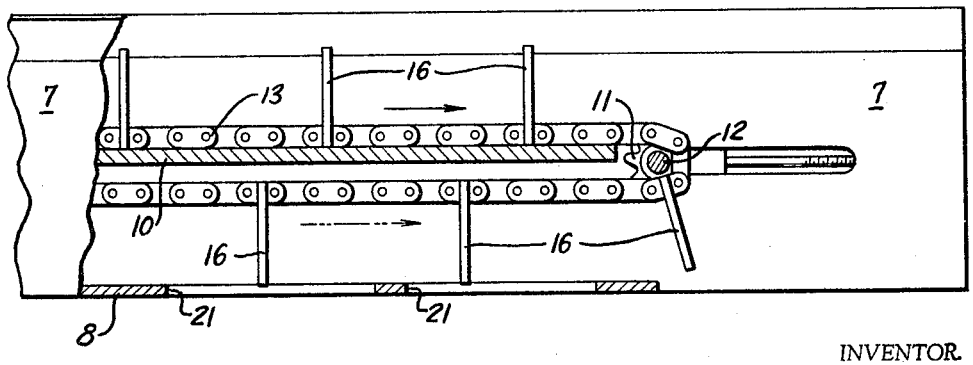
FIG. 5 is an enlarged side elevation of the rear end portion of the conveyor with parts broken away in section.

As best shown in FIGS. 4 and 5, a partition wall 10 is disposed in spaced relation above the bottom wall 8.

A drive sprocket 11 is secured to a shaft 12 which is journalled within bearings in the side walls 7 at the rear end of the conveyor 1. An endless chain 13 is trained over the sprocket 11 and also over an idler sprocket 14 which is secured to a shaft 15 journalled within bearings in the side walls 7 at the forward end of the conveyor. The central wall 10 is located between the paths of travel of the chain 13, and the chain carries a series of cleats or paddles 16 which move the material from the front to the rear end of the conveyor.

To drive the chain 13 and the cleats 16, a sprocket 17 is secured to shaft 12 and is located on the outside of the side wall 7. The sprocket 17 is connected by chain 18 to a sprocket 19 attached to the drive shaft of a hydraulic motor unit 20 mounted on the side wall 7. The hydraulic motor unit 20 is a reversible type so that the conveyor chain 13 can travel in either direction, as desired.

The use of the bottom wall 8 and the central wall 10, along with the reversible motor 20, permits the conveyor to convey materials when traveling in both directions. For example, when the conveyor is moving in the direction of the arrow in FIG. 5, the material will be conveyed along the upper surface of the wall 10 by the cleats or paddles 16, and this direction of travel is preferably used for heavier bulk materials, baled hay, or the like. When conveying finely divided, lightweight materials, which may be blown by the wind, the rotation of the chain 13 can be reversed so that the chain will travel in the direction of the phantom arrow in FIG. 5. With the conveyor traveling in this direction, the finely divided material will be conveyed upwardly between the wall 10 and the bottom wall 8, and will be discharged into the dump body 4 through a series of openings 21 formed in the bottom wall 8 adjacent the rear end of the conveyor. In the latter situation, where the material is being conveyed between the central wall 10 and the bottom wall 8, a hopper cover plate 22 is normally bolted onto the forward end of the conveyor. When the rotation of the conveyor is reversed so that it is operating in the manner of the solid arrows in FIG. 5, the hopper cover 22 is normally removed.

The conveyor 1 is adapted to be moved from a generally horizontal transporting position, as shown in FIG. 1, to an inclined conveying position, shown in phantom lines in FIG. 1, by a boom 23. As best shown in FIG. 3, the boom includes a pair of generally parallel side rails 24 which are connected together by a series of cross braces 25. The upper end of each side rail 24 is provided with an extension 26 having a series of bolt holes 27. A flanged plate 28 is secured to the bottom wall 8 of the conveyor and the downwardly extending flanges are provided with a series of bolt holes 29. Pins 30 extend through the aligned holes 27 and 29 and serve to pivotally connect the boom to the conveyor. The use of the series of holes 27 and 29 enables the unit to be readily installed on various makes of trucks.

The lower ends of the side rails 24 are provided with laterally extending legs 31 which are pivotally connected to a front bumper 32 of the truck.

A hydraulic unit is employed to pivot the boom 23 and thereby move the conveyor 1 between the transporting and conveying positions. The hydraulic unit includes a cylinder 33, and the lower end of the cylinder is located within a well 34 formed in the bumper 32 and is pivotally connected to the flanges 35 which border the well 34. A piston rod 36 is slidably disposed within the cylinder and the upper end of the piston rod is pivotally connected to a link 37, and the link in turn is connected between a pair of vertical plates 38 which extend between cross braces 25 on the boom. The hydraulic cylinder 33 is preferably a single acting unit in which hydraulic fluid is introduced through a hydraulic valve unit, indicated generally by 39, into the lower end of the cylinder 33 through line 40 to extend the piston rod 36, and the rod 36 is retracted into the cylinder 33 by gravity.

When it is desired to pivot the conveyor 1 downwardly to the inclined conveying position, the valve unit 39 is actuated to open the valve in line 40 and the piston rod will be retracted by gravity. As the piston rod 36 is retracted, the boom 23 will pivot forwardly and the conveyor 1 will be moved downwardly to the inclined conveying position shown in phantom in FIG. 1. When it is desired to return the conveyor to the transporting position, hydraulic fluid is introduced into the cylinder 33 through line 40 by operation of valve unit 39 to extend the piston rod 36 which pivots the boom 23 to a generally vertical position and moves the conveyor to the horizontal transporting position, as shown in FIG. 1.

The hydraulic valve unit 39 is also connected to hydraulic motor 20 by a suitable hydraulic line, not shown.

A safety device is employed to prevent pivoting of the boom when the conveyor is in the transporting position. The safety device takes the form of a semi-cylindrical member 40 which is pivotally connected to the pin which connects the link 37 and the piston rod 36. The member 40 will normally fall by gravity to the position shown in FIG. 2, where it bears against the upper end of the cylinder 33 and prevents the piston rod 36 from being retracted into the cylinder. When it is desired to move the conveyor to the conveying position, the safety member 40 is withdrawn by pulling a cable 41 which extends to the cab 3, and the piston rod can then be retracted into the cylinder to pivot the boom.

The conveyor 1 is supported for movement on a roller 42 which is rotatably supported between a pair of lugs 43 which extend upwardly from a nose or extension 44 secured to the forward end of the dump body 4. The bottom surface 8 of the conveyor is adapted to ride on the roller 42 and the lugs 43 extend upwardly beyond the roller and serve to prevent lateral displacement of the conveyor.

As the conveyor 1 is moved from the transporting to the inclined conveying position, the rear end of the conveyor rides on the roller 42 and conversely, when the conveyor is returned to the transporting position, the conveyor again rides along the roller 42. The nose or extension 44 is necessary in order to provide the necessary elevation for the rear end of the conveyor so that the conveyor will not contact the top of the cab when it is being moved downwardly to the inclined conveying position. With the structure of the invention, the forward end of the conveyor can be pivoted downwardly to a position approximately 18 inches beneath grade level, and when at this angle, the extension 44 elevates the rear end of the conveyor so that the conveyor will not scrape along the top of the cab.

In addition to the roller 42, the rear end of the conveyor is supported during transporting on an H-support 45 which is mounted on an arch 46 which extends between the sides of the dump body 4.

When it is desired to dump the material within the body 4, the body is pivoted upwardly by the hydraulic unit 6, as shown by the phantom lines in FIG. 2. As the dump body pivots upwardly, the roller 42 rides along the bottom surface 8 of the conveyor, tilting the conveyor about the pivotal connection between the conveyor and the boom. Thus, the conveyor will not interfere with the dumping operation, and no adjustment or re-positioning of the conveyor is required in order for the material to be dumped from the body 4.

The conveyor 1 is normally transported in the horizontal position, as shown in FIG. 1. When it is desired to load the material into the dump body, the safety member 40 is released and the boom 23 is pivoted downwardly through operation of the hydraulic unit to position the forward end of the conveyor at ground level or at the location of the material to be loaded. In the conveying position, as shown in the phantom lines in FIG. 1, the rear end of the conveyor is positioned over the dump body 4. The hydraulic valve unit 39 is then actuated to drive the conveyor motor 20 and the material is loaded into the forward end of the conveyor and conveyed upwardly and dumped into the body 4. When the loading is completed, hydraulic unit 39 is again actuated to pivot the boom and move conveyor 1 back to its original horizontal position.

When it is desired to dump the material from the body 4, the dump body is tilted by means of the hydraulic unit 6 and the roller 42 rides along the undersurface 8 of the conveyor as the dump body is pivoted. On the return of the dump body to its normal position, the roller 42 again rides on the surface 8 of the conveyor so that when the dump body is in the horizontal position the conveyor 1 is also in the horizontal position, as shown in FIG. 1.

The present conveying mechanism enables bulk material to be loaded extremely rapidly into the dump body and can be used to load a wide variety of materials, such as farm products, building construction materials, and the like.

The conveyor can be readily moved from the transporting to the conveying position solely through the operation of the hydraulic unit and it is not necessary to manually handle or assemble the conveyor. In addition, the dump body can be tilted with respect to the conveyor and the conveyor itself does not interfere with the dumping operation, even though the conveyor is located above the dump body 4.

Various modes of carrying out the invention are contemplated as being within the scope of the following claims particularly pointing out and distinctly claiming the subject matter which is regarded as the invention.

I claim:

1. In combination, a truck having a pivotal dump body, an elongated conveyor disposed above the truck and extending in a fore and aft direction with respect to the truck, a boom interconnecting a forward portion of the truck to the conveyor, means for pivoting said boom in said fore and aft direction to move the conveyor from a transporting position above the truck to an inclined conveying position in which the forward end of the conveyor is at a lower level ahead of the truck and the aft end of the conveyor is at a higher level above the dump body, and guide means connected to the dump body for supporting the aft portion of the conveyor in movement when the conveyor is moved between the transporting position and the conveying position and for supporting the conveyor when the dump body is pivoted to a dumping position.

2. In combination, a truck having a cab and having a pivotal dump body, an elongated conveyor disposed above the truck and extending in a fore and aft direction with respect to the truck, a boom pivotally connected to the forward portion of the conveyor and pivotally connected to a forward portion of the truck, means for pivoting said boom in said fore and aft direction to move the conveyor from a transporting position above the truck to an inclined conveying position in which the forward end of the conveyor is at a lower level ahead of the truck and the aft end of the conveyor is at a higher level above the dump body, and a guide member connected to said dump body and disposed in engagement with the conveyor and serving to support the conveyor.

3. In combination, a truck having a cab including a front bumper unit and having a pivotal dump body, an elongated conveyor disposed above the truck and extending in a fore and aft direction with respect to the truck, a boom having a lower end pivotally connected to the bumper unit and having an upper end pivotally connected to the forward portion of said conveyor, and hydraulic drive means for pivoting said boom in said fore and aft direction to move the conveyor from a transporting position above the truck to an inclined conveying position in which the forward end of the conveyor is at a lower level ahead of the truck and the aft end of the conveyor is at a higher level above the dump body, said hydraulic drive means including a cylinder member and a piston member with one of said members pivotally connected to the bumper unit and the other of said members pivotally connected to said boom.

4. In combination, a truck having a pivotal dump body and pivotable from a transporting position to a dumping position, an elongated conveyor disposed above the truck and extending in a fore and aft direction with respect to the truck, a boom interconnecting a forward portion of the truck to the conveyor, means for pivoting said boom in said fore and aft direction to move the conveyor from a transporting position above the truck to an inclined conveying position in which the forward end of the conveyor is at a lower level ahead of the truck and the aft end of the conveyor is at a higher level above the dump body, and means responsive to the dump body pivoting from the transporting position to the dumping position for moving the conveyor to a position where it will not interfere with the dumping of material from said body.

5. The structure of claim 4, in which the conveyor includes an endless member traveling in a fore path and an aft path, said conveyor also having a partition wall disposed between said fore and aft paths and having a bottom wall spaced below said partition wall.

6. In combination, a truck having a cab and having a pivotal dump body, an elongated conveyor disposed above the truck and extending in a fore and aft direction with respect to the truck, a boom pivotally connected to the forward portion of the conveyor and pivotally connected to a forward portion of the truck, means for pivoting said boom in said fore and aft direction to move the conveyor from a transporting position above the truck to an inclined conveying position in which the forward end of the conveyor is at a lower level ahead of the truck and the aft end of the conveyor is at a higher level above the dump body, and a roller guide mounted on the forward portion of the dump body and supporting said conveyor, said conveyor riding on said roller guide as the conveyor is moved between said transporting and conveying positions and riding on said roller guide as the dump body is pivoted relative to the cab.

7. The structure of claim 6, and an arch extending upwardly from the central portion of said body in position to support the rear portion of the conveyor when the conveyor is in the transporting position.

8. The structure of claim 3, and including locking means for selectively preventing relative movement between said piston member and said cylinder member and thereby lock the conveyor in a given position.

9. In combination, a truck having a cab and having a dump body pivoted at its rear end to the truck, the forward end of said dump body extending to a level above the cab, an elongated conveyor disposed above the truck and extending in a fore and aft direction with respect to the truck, a boom interconnecting a forward portion of the truck to the conveyor, means for pivoting said boom in said fore and aft direction to move the conveyor from a transporting position above the truck to an inclined conveying position in which the forward end of the conveyor is at a lower level ahead of the truck and the aft end of the conveyor is at a higher level above the dump body, and guide means associated with the forward end of the dump body for supporting the aft portion of the conveyor in movement when the conveyor is moved between the transporting position and the conveying position and for supporting the conveyor when the dump body is pivoted to a dumping position.

10. The structure of claim 9 and including locking means connected to the boom for locking the boom in a given position.

References Cited by the Examiner

UNITED STATES PATENTS

| | | | |
|---|---|---|---|
| 1,924,455 | 8/1933 | Penote | 198—118 |
| 2,199,257 | 4/1940 | Ferrin | 214—83.26 |
| 2,661,105 | 12/1953 | Purdy | 214—83.26 |
| 3,107,798 | 10/1963 | Overgard | 214—83.26 |

GERALD M. FORLENZA, *Primary Examiner.*

A. J. MAKAY, *Assistant Examiner.*